United States Patent
Ganapathiappan et al.

(10) Patent No.: US 9,133,344 B2
(45) Date of Patent: Sep. 15, 2015

(54) INK-JET INKS HAVING POLYMERS AND NEAR-INFRARED ABSORBING DYES

(75) Inventors: Sivapackia Ganapathiappan, Los Altos, CA (US); Howard S. Tom, San Jose, CA (US); Hou Ng, Palo Alto, CA (US); Jayprakash Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 731 days.

(21) Appl. No.: 13/379,950

(22) PCT Filed: Jun. 26, 2009

(86) PCT No.: PCT/US2009/048883
§ 371 (c)(1),
(2), (4) Date: Dec. 21, 2011

(87) PCT Pub. No.: WO2010/151264
PCT Pub. Date: Dec. 29, 2010

(65) Prior Publication Data
US 2012/0092428 A1    Apr. 19, 2012

(51) Int. Cl.
| | |
|---|---|
| B41J 2/01 | (2006.01) |
| C09B 47/04 | (2006.01) |
| B41J 2/21 | (2006.01) |
| B41J 11/00 | (2006.01) |
| C09B 7/00 | (2006.01) |
| C09D 7/12 | (2006.01) |
| C09D 11/101 | (2014.01) |
| C09D 11/328 | (2014.01) |
| C08K 5/00 | (2006.01) |

(52) U.S. Cl.
CPC ............. C09B 47/045 (2013.01); B41J 2/2107 (2013.01); B41J 11/002 (2013.01); C09B 7/00 (2013.01); C09D 7/1233 (2013.01); C09D 11/101 (2013.01); C09D 11/328 (2013.01); C08K 5/0091 (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41M 5/0011; B41M 5/0017; B41M 7/00; C09D 11/36; C09D 11/40; C09D 11/30; C09D 11/38; C09D 11/322; C09D 11/328; C09D 11/101; C09D 11/005; C09D 11/54; C09D 11/52

USPC ............ 347/100, 95, 96, 101, 102, 103, 104, 347/105, 20, 22, 21, 9; 106/31.6, 31.13, 106/31.27; 523/160, 161
See application file for complete search history.

(56) References Cited

U.S. PATENT DOCUMENTS

| | | | | |
|---|---|---|---|---|
| 4,269,627 | A * | 5/1981 | Hwang | 523/161 |
| 4,892,584 | A * | 1/1990 | Chapman | 347/100 |
| 5,282,894 | A * | 2/1994 | Albert et al. | 106/31.46 |
| 5,614,008 | A * | 3/1997 | Escano et al. | 347/100 |
| 6,150,494 | A | 11/2000 | Wang et al. | |
| 6,165,654 | A | 12/2000 | Taylor, Jr. et al. | |
| 6,361,916 | B1 * | 3/2002 | Chen et al. | 347/100 |
| 6,706,460 | B1 * | 3/2004 | Williams et al. | 106/31.13 |
| 6,811,253 | B1 | 11/2004 | King et al. | |
| 2004/0157956 | A1 | 8/2004 | Vincent et al. | |
| 2006/0050119 | A1 * | 3/2006 | Jackson | 347/100 |
| 2006/0172234 | A1 | 8/2006 | Fukui | |
| 2008/0006177 | A1 * | 1/2008 | Indusegaram et al. | 347/1 |
| 2008/0166650 | A1 | 7/2008 | Hasegawa et al. | |

FOREIGN PATENT DOCUMENTS

| | | |
|---|---|---|
| CN | 101248142 | 8/2008 |
| DE | 3802031 | 7/1989 |
| EP | 0134518 | 3/1985 |
| EP | 1093018 | 4/2001 |
| EP | 1108757 | 6/2001 |
| EP | 1491355 | 12/2004 |
| EP | 1965275 | 9/2008 |
| JP | 2507795 | 6/1996 |
| WO | WO-02083798 | 10/2002 |

OTHER PUBLICATIONS

Extended European Search Report dated Jul. 23, 2013 for Application No./Patent No. 09846637.8-1454 / 2445977 / PCT/US2009/048883 for Hewlett-Packard Development Company, L.P.

* cited by examiner

*Primary Examiner* — Manish S Shah
(74) *Attorney, Agent, or Firm* — Thorpe, North & Western L.L.P.

(57) ABSTRACT

The present disclosure is drawn to methods and compositions directed at durable ink-jet inks. As such, an ink-jet ink can have a liquid vehicle, a colorant dispersed or dissolved in the liquid vehicle, a high Tg polymer having a Tg of at least 45.degree. C. dispersed in the liquid vehicle, and a near-infrared absorbing dye in the liquid vehicle. The ink can be formulated such that when printed on a substrate and irradiated with a near-infrared energy source, the near-infrared absorbing dye generates enough heat to uniformly melt the high Tg polymer, thereby enhancing the durability of ink-jet ink printed on the substrate.

17 Claims, No Drawings

INK-JET INKS HAVING POLYMERS AND NEAR-INFRARED ABSORBING DYES

BACKGROUND

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to thermal ink-jet architecture.

As ink-jet ink applications have advanced, improvement of such printing systems through ongoing research and developmental efforts continue to be sought.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink-jet ink. Liquid vehicles are well known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, $T_g$ is the glass transition temperature as calculated by the Fox equation: copolymer $T_g = 1/(Wa/(T_gA) + Wb(T_gB) + \ldots)$ where Wa=weight fraction of monomer A in the copolymer and $T_gA$ is the homopolymer $T_g$ value of monomer A, Wb=weight fraction of monomer B and $T_gB$ is the homopolymer $T_g$ value of monomer B, etc.

The term "near-infrared" or "near IR" refers to optical radiation in the range of about 700 nm to 1400 nm. In accordance with embodiments of the present disclosure, the near IR absorbing dyes of the present disclosure can absorb optical radiation within the near IR spectrum, and in one embodiment, in the 700 nm to 1000 nm range, and convert the absorbed radiation to thermal energy.

As used herein, "colorant" can include dyes, pigments, and/or other particulates that may be suspended or dissolved in an ink vehicle prepared in accordance with embodiments of the present disclosure. Dyes are typically water soluble, and therefore, can be desirable for use in some embodiments. However, pigments can also be used in other embodiments. Pigments that can be used include self-dispersed pigments and polymer dispersed pigments. Self-dispersed pigments include those that have been chemically surface modified with a small molecule, a polymeric grouping, or a charge. This chemical modification aids the pigment in becoming and/or substantially remaining dispersed in a liquid vehicle. The pigment can also be dispersed by a separate additive, which can be a polymer, an oligomer, or a surfactant, for example, in the liquid vehicle and/or in the pigment that utilizes a physical coating to aid the pigment in becoming and/or substantially remaining dispersed in a liquid vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "dye" refers to the individual compound, complex, or molecule responsible for an ink's color, and is typically water soluble. This term also includes dyes that affect the overall color of an ink but are not themselves the predominant color. For example, a black ink may contain one or more black dye(s) but may also contain a yellow dye allowing for a more neutral black color.

As used herein, the term "uniform," or "uniformly" when referring to the melt characteristics of a polymer on a printed substrate includes physical shape transformation of the polymer that occurs after irradiation. Typically, when high $T_g$ polymers are printed on a substrate, they do not form effective films from the printing process per se, i.e. they remain in a more particulate shape without congealing to form a film. In accordance with embodiments of the present disclosure, upon irradiation with appropriately configured near-IR radiation combined with appropriately matched near-infrared absorbing dyes, the particulate shaped polymers become more film like. Thus, the term "uniform" refers to the shape modification of more particulate configured polymer particles to a more continuous film configuration. In one embodiment, the uniform polymer can substantially cover the surface of the underlying substrate on which the polymer or latex polymer has been printed with a minimum thickness of about 10 nm.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When referring to uniform melt, substantial or substantially refers to achieving at least 95% coverage of the underlying printed surface.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that the use of high $T_g$ polymers with associated near-infrared absorbing dyes can provide a durable ink-jet image. In accordance with this, the present disclosure is drawn to compositions and methods using high $T_g$ polymers and near-infrared absorbing dyes for use in ink-jet ink applications. It is noted that when discussing the present compositions or associated methods, each of these discussions can be considered applicable to each of these embodiments, whether or not they are explicitly discussed in the context of that embodiment. Thus, for example, in discussing a near-infrared absorbing dye present in an ink-jet ink, such a near-infrared absorbing dye can also be used in a method for printing a durable ink-jet image, and vice versa.

With these definitions and the above discussion in mind, an ink-jet ink can comprise a liquid vehicle, a colorant dispersed or dissolved in the liquid vehicle, a high $T_g$ polymer having a $T_g$ of at least 45° C. dispersed in the liquid vehicle, and a near-infrared absorbing dye in the liquid vehicle. Additionally, the ink can be formulated such that when printed on a substrate and irradiated with a near-infrared energy source, the near-infrared absorbing dye generates enough heat to uniformly melt the high $T_g$ polymer, thereby enhancing the durability of ink-jet ink printed on the substrate.

A method for printing a durable ink-jet image can comprise printing any ink-jet ink described herein on a substrate, and irradiating the ink-jet ink on the substrate with a near-infrared energy source to cause the near-infrared absorbing dye to generate enough heat to uniformly melt the high $T_g$ polymer, thereby enhancing the durability of ink-jet ink printed on the substrate.

As noted previously, when high $T_g$ polymers are printed on a substrate, they do not typically form effective films from the printing process per se, i.e. they remain in a more particulate shape without congealing to form a film. Thus, upon irradiation with near-infrared radiation that is matched to excite near-infrared absorbing dyes, the particulate polymers on the printed substrate can become more film like. These polymers provide a durable protective film over or throughout the printed ink because of the high glass transition temperature. However, these types of polymers have not been used as much as polymers with lower glass transition temperatures because they do not form effective films upon the sole act of printing. The presence of the near-infrared absorbing dyes in combination with an appropriately configured energy source enables these high $T_g$ polymers to be used effectively, forming films after printing using an appropriate energy source as described herein.

Generally, a high $T_g$ polymer can be any polymer having a $T_g$ of at least 45° C. In one embodiment, the high $T_g$ polymer can have a $T_g$ from about 45° C. to about 125° C. In another embodiment, the high $T_g$ polymer can have a $T_g$ from about 50° C. to about 80° C. As discussed above, the present ranges include all sub-ranges. For example, the high $T_g$ polymer can have a $T_g$ from about 45° C. to about 80° C., about 50° C. to about 100° C., about 50° C. to about 125° C., about 80° C. to about 100° C., etc.

Generally, the high $T_g$ polymer can be copolymerized from various monomers sufficient to provide the high $T_g$ polymer with a $T_g$ of at least 45° C. In one embodiment, the high $T_g$ polymer can be a latex polymer copolymerized from hydrophobic monomers, acid monomers, and cross-linking monomers. In one aspect, the high $T_g$ polymer can be a hydrophobic latex polymer prepared from copolymerized monomers comprising a hydrophobic monomer present in an amount of about 50 wt % to about 98 wt %, an acid monomer present in the amount of about 0.5 wt % to about 30 wt %, and a cross-linking agent present in the amount of about 0.1 wt % to about 15 wt %.

The hydrophobic monomer can be present in the polymer from up to 98 wt %. Hydrophobic monomers that can be polymerized in the high $T_g$ polymer include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers can be present in the polymer from up about 0.5 wt % to about 20 wt %. Acidic monomers that can be used in the high $T_g$ polymer include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Cross-linking monomers can be present in the polymer from about 0.01 wt % to about 15 wt %. Suitable cross-linking monomers include polyfunctional monomers and oligomers that contain an organic functional group available for cross-linking after polymerization. Cross-linking monomers that can be used in the high $T_g$ polymer include, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene, and combinations thereof, mixtures thereof, and derivatives thereof.

While the high $T_g$ polymer and the near-infrared absorbing dye can be generally physically separated from one another, in one embodiment, the near-infrared absorbing dye is encapsulated by the high $T_g$ polymer. Such encapsulation can include partially or fully encapsulation. Additionally, the encapsulation can include an amount of dye sufficient to uniformly melt or uniformly melt the encapsulating polymer. In one embodiment, the encapsulated dye can have a ratio, measured in weight percent, of polymer to dye of about 0.001 wt % to about 20 wt %. In one embodiment, the ratio can be about 0.01 wt % to about 5 wt %. In another embodiment, the ratio can be about 0.1 wt % to 2 wt %.

Additionally, the near-infrared absorbing dye can be matched to cause the high $T_g$ polymer to melt. For example, upon irradiation with appropriately matched near-infrared energy, the near-infrared absorbing dye can generate heat that is at least 2° C. more than the melting point of the high $T_g$ polymer. In other embodiments, the near-infrared absorbing dye can generate heat that is at least 5° C. more or even 10° C. more than the melting point of the high $T_g$ polymer. In another embodiment, the near-infrared absorbing dye can generate heat that is at about 10° C. to about 20° C. more than the melting point of the high $T_g$ polymer. In yet another embodiment, the near-infrared absorbing dye can generate heat that is no more than 10° C. above the melting point of the high $T_g$ polymer.

While near-infrared absorbing dyes can be used for various purposes in inks, in one embodiment, the heat generated from the near-infrared absorbing dyes does not change the color properties of the colorant. In other words, the ink formulation is such that the near-infrared absorbing dye causes melting of the high $T_g$ polymer, but does not significantly affect other properties of the ink, e.g., color, image quality, etc. The near-infrared absorbing dye is not present, for example, to modify or convert a dye from one color to another. Particularly, the present disclosure can include any near-absorbing dyes that generate heat sufficient to melt the high $T_g$ polymer as described herein. In one embodiment, the near-infrared absorbing dye can be a water soluble near-infrared absorbing dye. As such, in one embodiment, the water soluble near-infrared absorbing dye can be selected from the group consisting of:

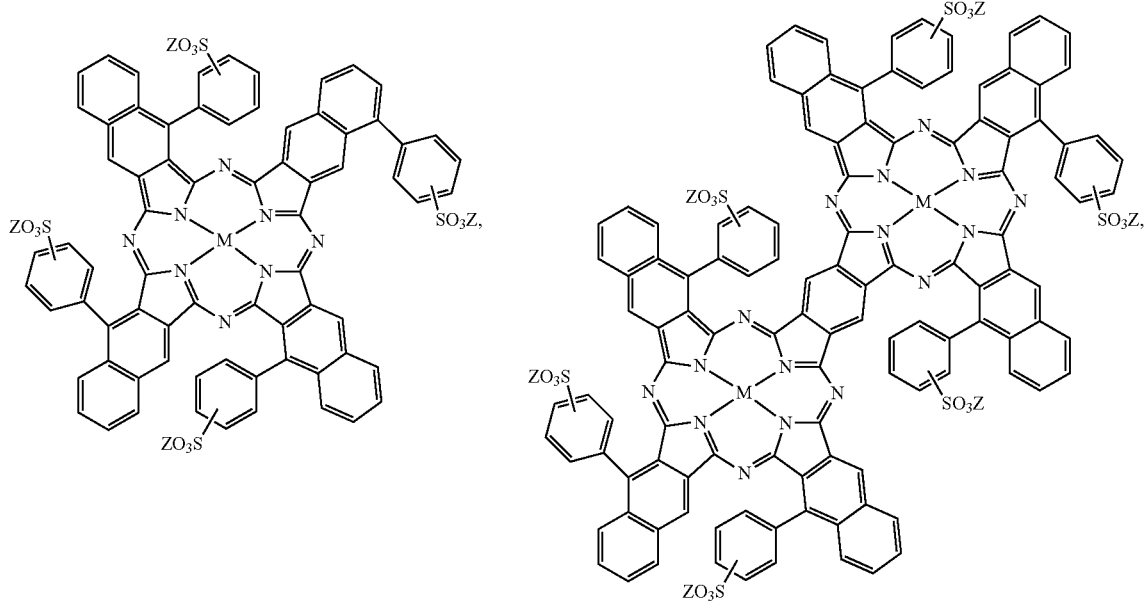

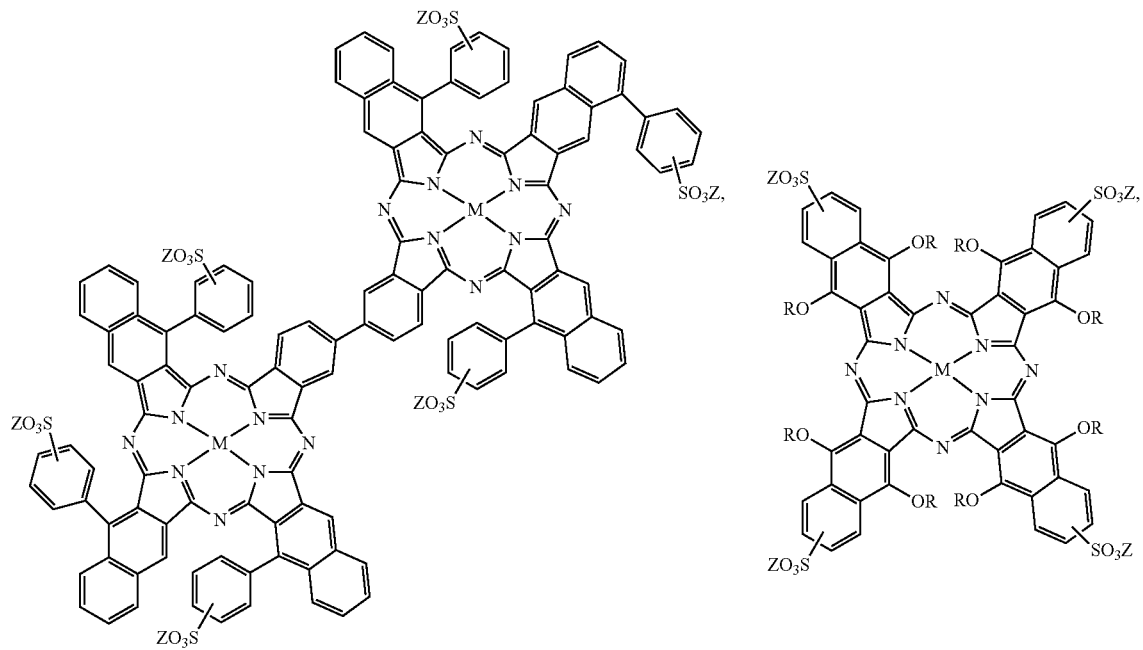

and mixtures thereof. In the above formulations, M can be a divalent metal atom (e.g., copper) or can have OSO$_3$Na axial groups filling any unfilled valencies if the metal is more than divalent (e.g., indium), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, NH$_4^+$, etc.

In one aspect, the water soluble near-infrared absorbing dye can be selected from the group consisting of:

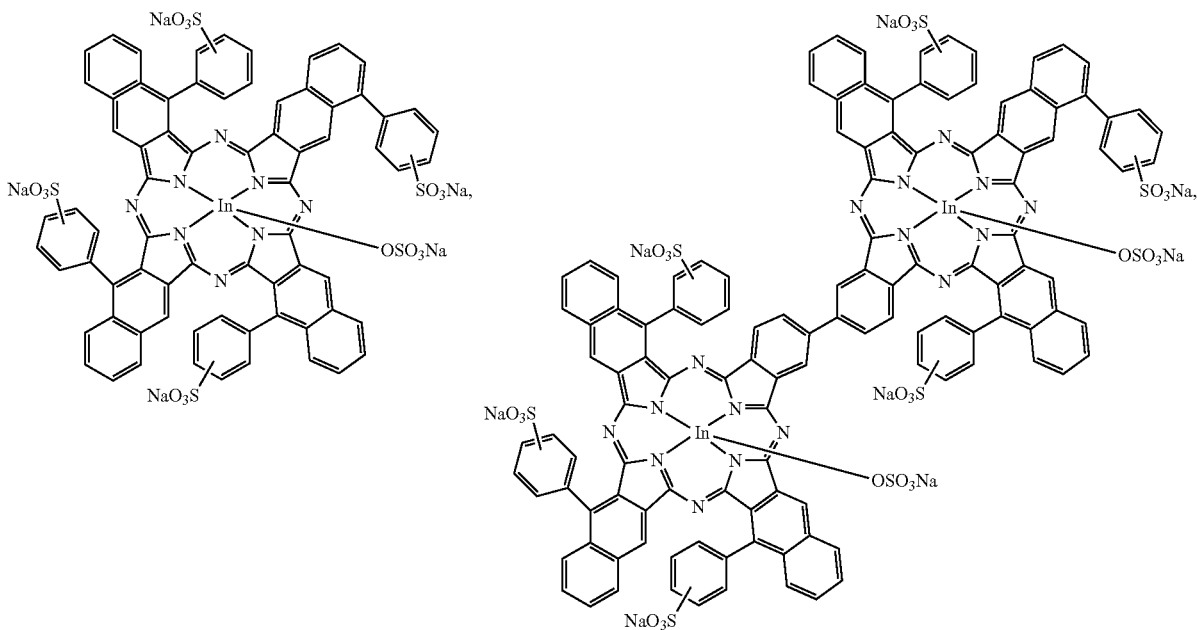

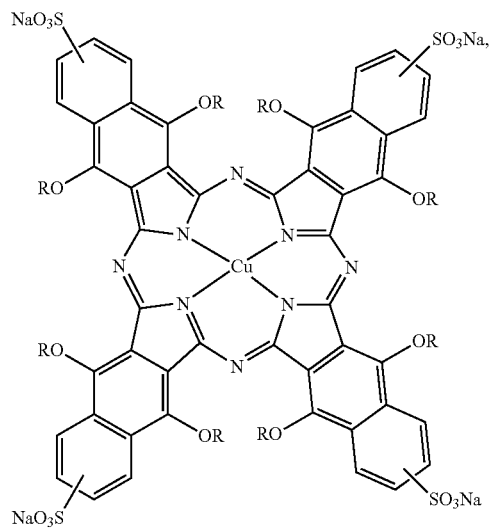
and mixtures thereof. In the above formulations, R can be any C1-C8 alkyl group (including substituted alkyl and unsubstituted alkyl).
In another embodiment, the near-infrared absorbing dye can be a hydrophobic near-infrared absorbing dye. The hydrophobic near-infrared absorbing dye can be selected from the group consisting of:
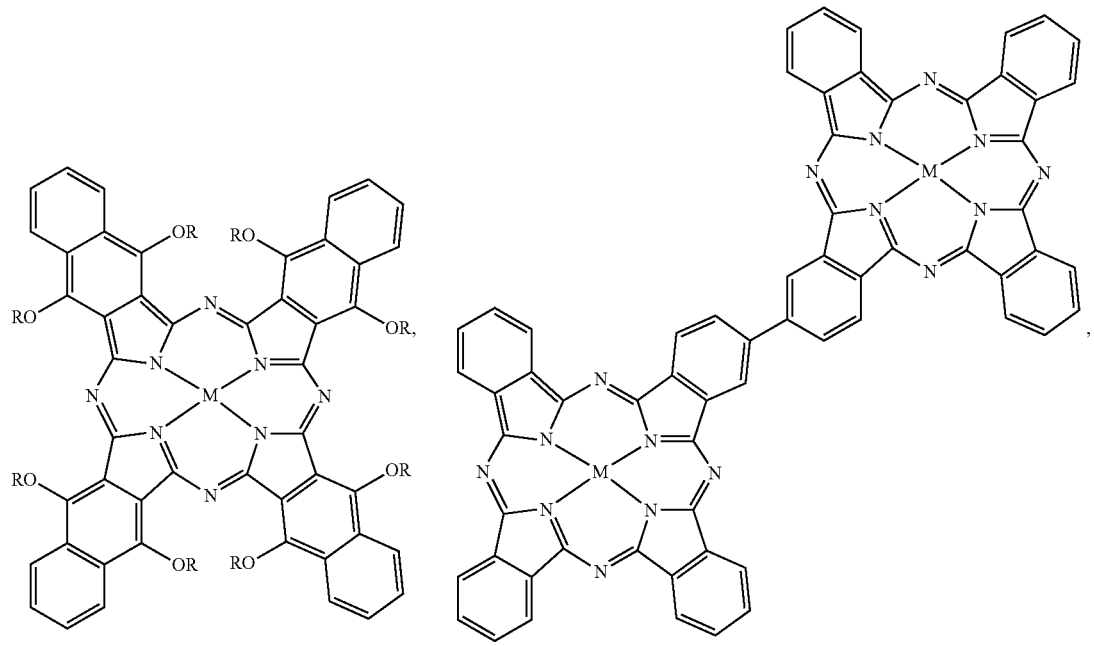

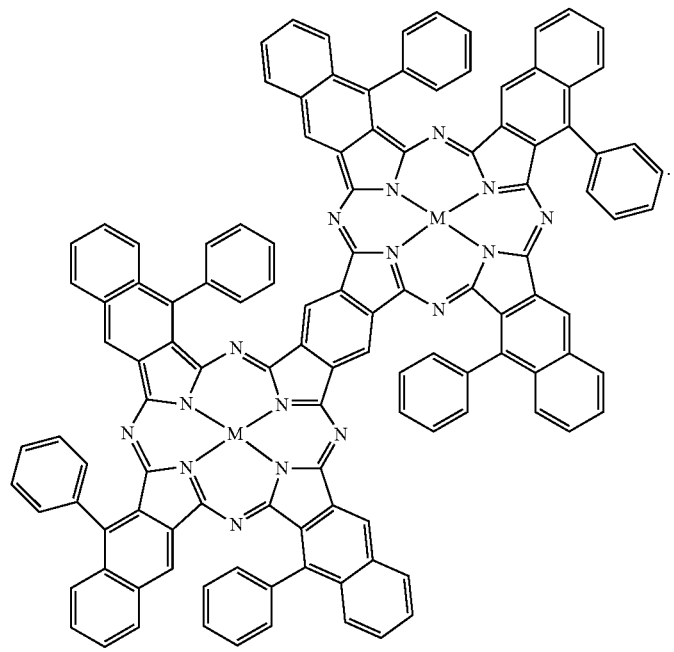

and mixtures thereof. For hydrophobic near-infrared absorbing dyes, M can be a divalent metal atom (e.g., copper) or can include a metal that has Cl, Br, OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl). In one aspect, the hydrophobic near-infrared absorbing dye can be selected from the group consisting of:

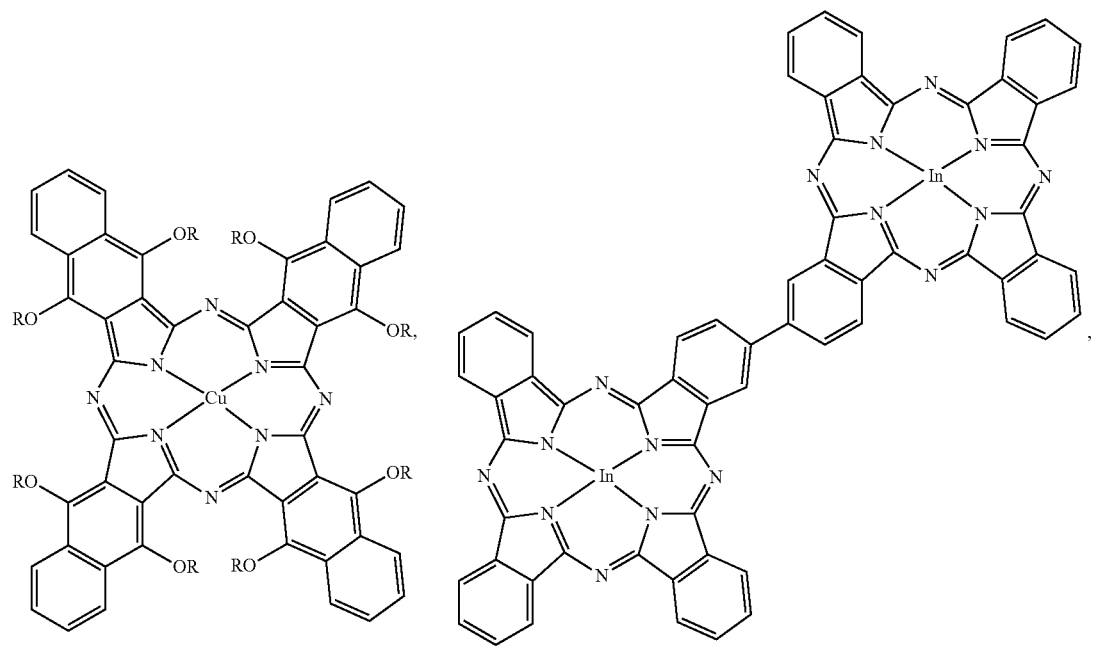

-continued

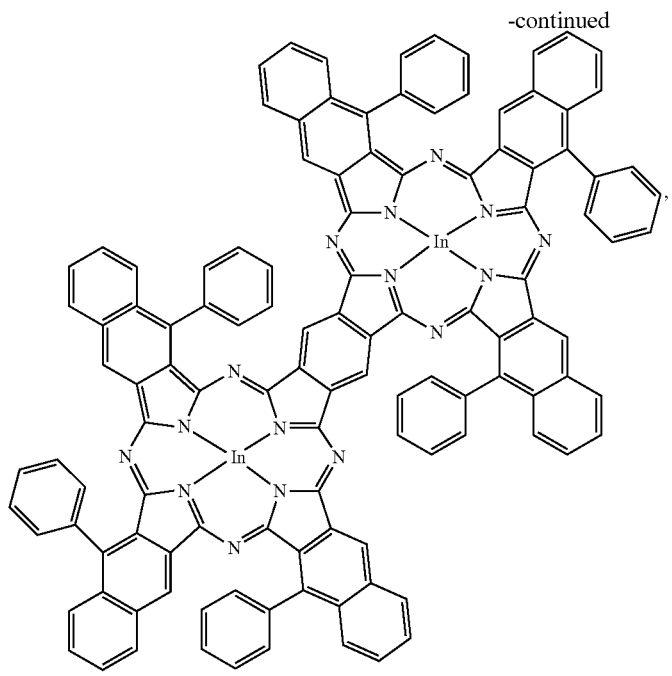

and mixtures thereof. For hydrophobic near-infrared absorbing dyes, M can be a divalent metal atom (e.g., copper) or can include a metal that has Cl, Br, OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

For the near-infrared absorbing dyes illustrated herein, the bonds from the nitrogen to the metal have been shown as straight lines, but with the understanding that such bonds may be covalent, coordinate, and/or coordinate covalent such that they generally fill the valencies for divalent metals. As previously noted, if the metal is more than divalent, any unfilled valencies can be filled by axial groups, such as those listed herein.

While M in the above formulations can be any metal, in one embodiment, the metal can be selected from the group consisting of indium, gallium, thallium, germanium, tin (II and IV), antimony, bismuth, zinc, cobalt, copper, nickel, silicon, titanium, vanadium, chromium, manganese, yttrium, scandium, zirconium, niobium, molybdenum, ruthenium, rhodium, hafnium, tantalum, bismuth, and mixtures thereof.

The near-infrared absorbing dye can be present in the ink-jet ink in an amount of about 0.01 wt % to about 20 wt %. In one embodiment, the near-absorbing dye can be present in the inkjet ink in an amount of about 0.1 wt % to about 10 wt %. In another embodiment, the near-absorbing dye can be present in the ink-jet ink in an amount of about 1 wt % to about 5 wt %. It is also noted that the colorant can also be present at concentrations from about 0.1 wt % to about 10 wt %. As discussed above, the present ranges include all sub-ranges. For example, the near-absorbing dye can be present in the ink-jet ink in an amount of about 0.5 wt % to about 20 wt %, about 0.1 wt % to about 5 wt %, about 1 wt % to about 20 wt %, etc.

In accordance with embodiments of the present disclosure, the ink-jet ink composition can have increased durability when printed on a substrate. In one embodiment, the durability of the ink-jet ink printed on the substrate and irradiated with the near-infrared energy source can be increased compared to a comparative ink that does not contain the near-infrared absorbing dye and is not irradiated with the near-infrared energy source. When referring to a "comparative ink," the comparative ink contains the same compositional elements as the durable ink-jet ink except that the comparative ink does not have the near-infrared absorbing dye, allowing for an objective evaluation as to the impact of the near-infrared absorbing dye in forming a film of the included polymer. Additionally, in one embodiment, the durability can be measured as improved highlighter smearfastness, rub resistance, and wet smudgefastness. In another embodiment, the ink-jet ink having the near-infrared absorbing dye can provide increased optical density compared to a comparative ink that does not contain the near-infrared absorbing dye.

Additionally, the high $T_g$ polymers and high $T_g$ latex polymers described herein can be further stabilized by addition of surfactants. As such, in one embodiment, the polymers can further comprise a reactive surfactant during the polymerization process. Generally, the reactive surfactant contains hydrophobic moieties that can be covalently bound to the surface of the polymeric particles. Additionally, such a reactive surfactant can be incorporated during the polymerization via appropriate organic groups, e.g., a vinyl group, such that the surface of the polymeric particles contains the reactive surfactant. Generally, the reactive surfactant can contain hydrophilic groups that allow the polymeric particles to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in one embodiment, the reactive surfactants can be functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAX-EMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

With these parameters in place regarding some of the possible high $T_g$ polymers that can be formed, a discussion of dispersion fluids, e.g., inks, etc., is useful to exemplify how these polymers can be implemented for use in accordance with an embodiment of the present disclosure. Typically, as discussed above, inks include a colorant dispersed in a liquid vehicle. Typical liquid vehicle formulation that can be used with the high $T_g$ polymers described herein can include water, and optionally, one or more co-solvents present in total at from 0.1 wt % to 30 wt %, depending on the jetting architecture. Further, one or more non-ionic, cationic, and/or anionic surfactant can optionally be present, ranging from 0.01 wt % to 10 wt %. The balance of the formulation can be purified water, or other vehicle components known in the art, such as biocides, viscosity modifiers, materials for pH adjustment, sequestering agents, preservatives, and the like. In one embodiment, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0 wt % to 10 wt %. It is to be noted that the surfactant that is described as being usable in the liquid vehicle is not the same as the surfactant that is described as being adhered to the surface of the polymeric particles, though many of the same surfactants can be used for either purpose.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

EXAMPLES

The following examples illustrate embodiments of the disclosure that are presently known. Thus, these examples should not be considered as limitations of the disclosure, but are merely in place to teach how to make compositions of the present disclosure. As such, a representative number of compositions and their method of manufacture are disclosed herein.

Example 1

High $T_g$ Polymer Preparation

The monomers styrene (312 g), butyl acrylate (80 g) and methacrylic acid (8 g) are emulsified in water (160 ml) containing reactive surfactant MAXEMUL 6106 (2 g) from Uniqema. Initiator solution is prepared by dissolving potassium persulfate (2 g) in water (160 ml). Water (1160 ml) is heated to 90 C. Then, 32 ml of the initiator solution is added to hot water followed by the simultaneous addition of the remaining initiator solution and emulsion. The emulsion addition takes 50 minutes while the initiator addition takes 55 minutes. The reaction mixture is maintained at a temperature of about 90° C. for a period of about 2.5 hours and then cooled to ambient temperature. The pH of this latex is then adjusted to 8.5 with 50% potassium hydroxide solution, and is filtered with a 200 mesh filter to obtain latex particles at about 20 wt % solid.

Example 2

Durable Ink Composition

An ink-jettable ink composition is prepared by dispersing 6 to 8 wt % solid of the composition of Example 1 in a liquid vehicle. This liquid vehicle includes up to 25 wt % organic co-solvent, 1 wt % surfactant, and 0.5 wt % biocide, with the balance being water. To the composition is also added about 2 to 3 wt % of pigments to impart color and 1 wt % of near infrared dye, namely copper(II) naphthalocyanine sulfonate. It is noted that any of the other disclosed or similar infrared absorbing dyes can be substituted for the copper(II) naphthalocyanine sulfonate as well.

Example 3

Encapsulation of Near-Infrared Absorbing Dye

Example 1 is repeated by adding copper(II) naphthalocyanine (20 g) to the monomer mixture during polymerization. The resultant mixture contains near infrared dye to polymer in the ratio of about 1 wt %:20 wt %. It is noted that any of the other disclosed or similar infrared absorbing dyes can be substituted for the copper(II) naphthalocyanine sulfonate as well.

Example 4

Durable Ink Composition

An ink-jettable composition is prepared by dispersing 6 to 8 wt % solid of the composition of Example 3 in a liquid vehicle. This liquid vehicle includes up to 25 wt % organic co-solvent, 1 wt % surfactant, and 0.5 wt % biocide, with the balance being water. To the composition is also added about 2 to 3 wt % of pigments to impart color.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. An ink-jet ink, comprising:
a) a liquid vehicle;
b) a colorant dispersed or dissolved in the liquid vehicle, wherein the colorant imparts a color to the ink;
c) a high $T_g$ polymer having a $T_g$ of at least 45° C. dispersed in the liquid vehicle, and
d) a near-infrared absorbing dye in the liquid vehicle,
wherein the ink is configured such that when printed on a substrate and irradiated with a near-infrared energy source, the near-infrared absorbing dye generates enough heat to uniformly melt the high $T_g$ polymer, thereby enhancing the durability of ink-jet ink printed on the substrate.

2. The ink-jet ink of claim 1, wherein the high $T_g$ polymer has a $T_g$ from about 45° C. to about 125° C.

3. The ink jet ink of claim 1, wherein the high $T_g$ polymer has a $T_g$ from about 50° C. to about 80° C.

4. The ink-jet ink of claim 1, wherein the near-infrared absorbing dye and the high $T_g$ polymer are physically separate from one another.

5. The ink-jet ink of claim 1, wherein the near-infrared absorbing dye is encapsulated by the high $T_g$ polymer.

6. The ink-jet ink of claim 1, wherein the high $T_g$ polymer is a hydrophobic latex polymer prepared from copolymerized monomers comprising a hydrophobic monomer present in an amount of about 50 wt % to about 98 wt %, an acid monomer present in the amount of about 0.5 wt % to about 30 wt %, and a cross-linking agent present in the amount of about 0.1 wt % to about 15 wt %.

7. The ink-jet ink of claim 1, wherein the near-infrared absorbing dye generates heat that is at least 2° C. more than the melting point of the high $T_g$ polymer.

8. The ink-jet ink of claim 1, wherein the near-infrared absorbing dye generates heat that is from 10° C. to 20° C. more than the melting point of the high $T_g$ polymer.

9. The ink-jet ink of claim 1, wherein the heat does not change the color properties of the colorant.

10. The ink-jet ink of claim 1, wherein the durability of the ink-jet ink printed on the substrate and irradiated with the near-infrared energy source is increased compared to a comparative ink that does not contain the near-infrared absorbing dye and is not irradiated with the near-infrared energy source.

11. The ink-jet ink of claim 1, wherein the near-infrared absorbing dye is a water soluble near-infrared absorbing dye selected from the group consisting of:

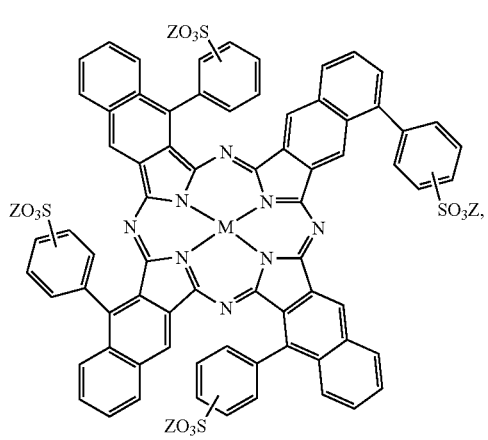

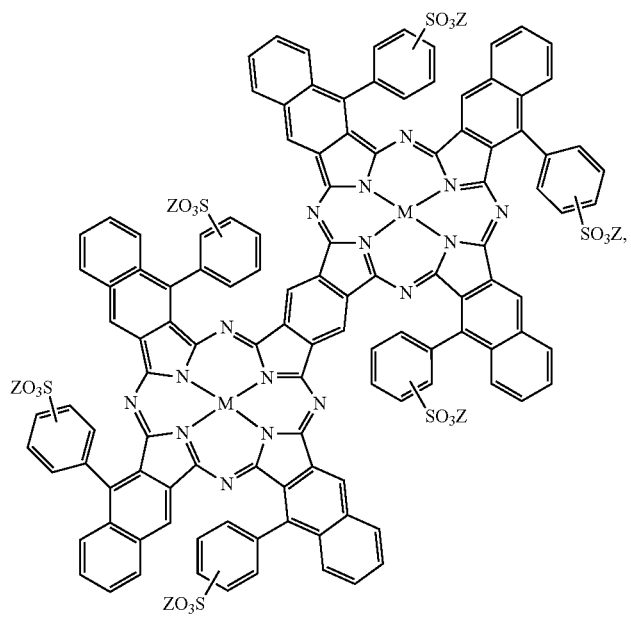

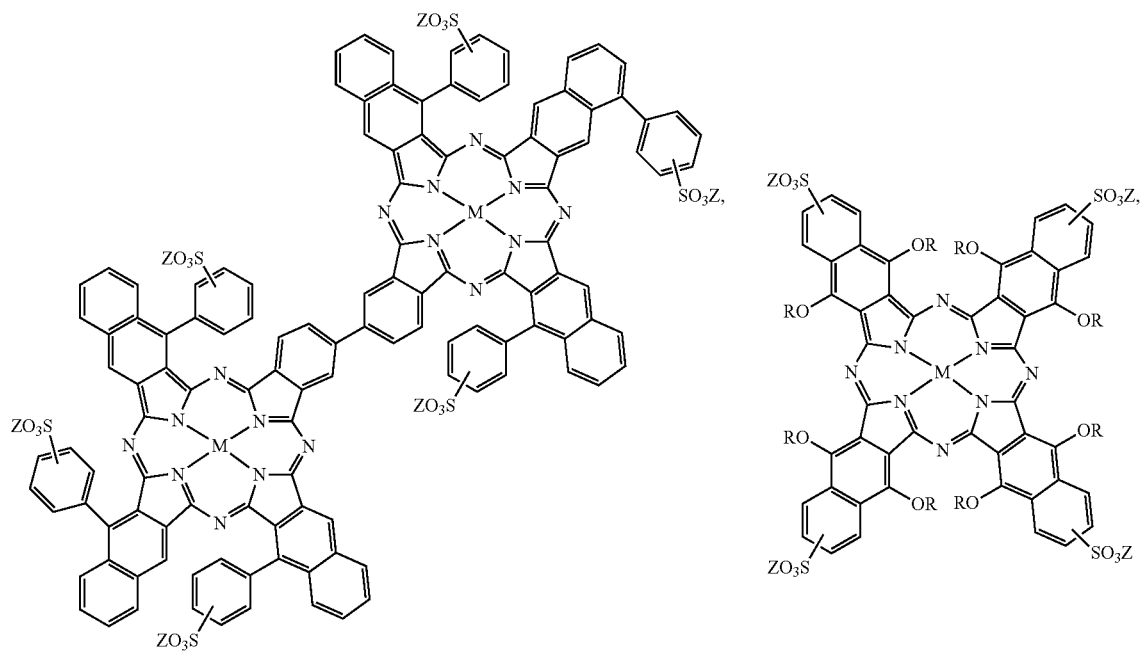

30 and mixtures thereof, wherein M is a divalent metal atom or has $OSO_3Z$ axial groups filling any unfilled valencies if the metal is more than divalent, R is substituted or unsubstituted C1-C8 alkyl, and Z is a counterion such that the overall charge of the near-infrared absorbing dye is neutral.

12. The ink-jet ink of claim 1, wherein the near-infrared absorbing dye is a hydrophobic near-infrared absorbing dye selected from the group consisting of:

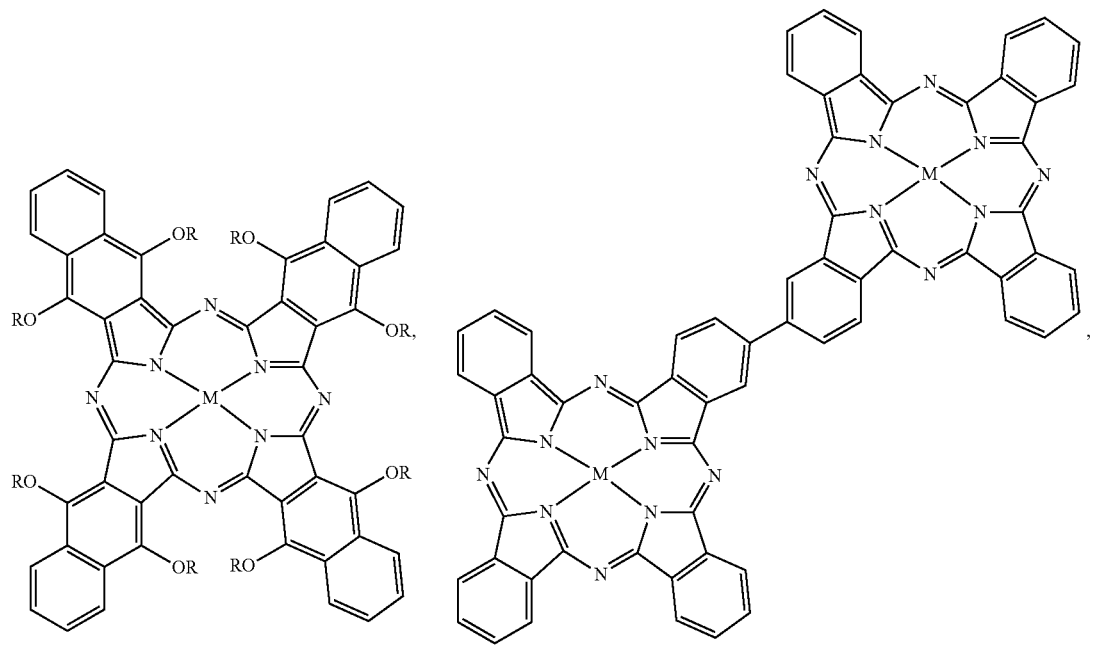

-continued

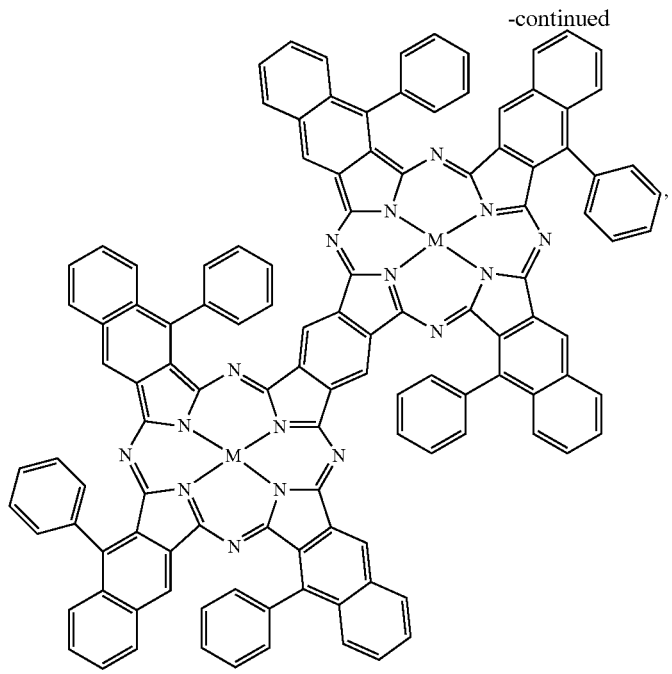

and mixtures thereof, wherein M is a divalent metal atom or is a metal that has Cl, Br, OR' axial groups filling any unfilled valencies if the metal is more than divalent, R is substituted or unsubstituted C1-C8 alkyl, and R' is H, $CH_3$, $COCH_3$, $COCH_2COOCH_3$, or $COCH_2COCH_3$.

13. The ink-jet of claim 11 or claim 12, wherein the metal is selected from the group consisting of indium, gallium, thallium, germanium, tin (II and IV), antimony, bismuth, zinc, cobalt, copper, nickel, silicon, titanium, vanadium, chromium, manganese, yttrium, scandium, zirconium, niobium, molybdenum, ruthenium, rhodium, hafnium, tantalum, bismuth, and mixtures thereof.

14. The ink-jet ink of claim 1, wherein the near-infrared absorbing dye is present in the ink in an amount of about 0.01 wt % to about 20 wt %.

15. A method for printing a durable ink-jet image, comprising:
   a) printing an ink-jet ink of claim 1 on a substrate, and
   b) irradiating the ink-jet ink on the substrate with a near-infrared energy source to cause the near-infrared absorbing dye to generate enough heat to uniformly melt the high $T_g$ polymer, thereby enhancing the durability of ink jet ink printed on the substrate.

16. The method of claim 15, wherein melting the high $T_g$ polymer causes the polymer to form a film on at least 95% of a printed area of the substrate.

17. The ink-jet ink of claim 1, wherein the colorant is a pigment.

* * * * *

UNITED STATES PATENT AND TRADEMARK OFFICE
CERTIFICATE OF CORRECTION

| | | |
|---|---|---|
| PATENT NO. | : 9,133,344 B2 | Page 1 of 1 |
| APPLICATION NO. | : 13/379950 | |
| DATED | : September 15, 2015 | |
| INVENTOR(S) | : Sivapackia Ganapathiappan et al. | |

It is certified that error appears in the above-identified patent and that said Letters Patent is hereby corrected as shown below:

In The Claims

In column 18, line 12, in Claim 3, delete "ink jet" and insert -- ink-jet --, therefor.

Signed and Sealed this
First Day of March, 2016

Michelle K. Lee
*Director of the United States Patent and Trademark Office*